United States Patent
Claraz et al.

(10) Patent No.: US 11,709,717 B2
(45) Date of Patent: Jul. 25, 2023

(54) METHOD FOR DESIGNING AN APPLICATION TASK ARCHITECTURE OF AN ELECTRONIC CONTROL UNIT WITH ONE OR MORE VIRTUAL CORES

(71) Applicants: CONTINENTAL AUTOMOTIVE FRANCE, Toulouse (FR); CONTINENTAL AUTOMOTIVE GmbH, Hannover (DE)

(72) Inventors: Denis Claraz, Toulouse (FR); André Goebel, Regensburg (DE); Ralph Mader, Bad Abbach (DE)

(73) Assignee: VITESCO TECHNOLOGIES GMBH, Regensburg (DE)

(*) Notice: Subject to any disclaimer, the term of this patent is extended or adjusted under 35 U.S.C. 154(b) by 196 days.

(21) Appl. No.: 16/965,216

(22) PCT Filed: Jan. 22, 2019

(86) PCT No.: PCT/FR2019/050129
§ 371 (c)(1),
(2) Date: Jul. 27, 2020

(87) PCT Pub. No.: WO2019/145632
PCT Pub. Date: Aug. 1, 2019

(65) Prior Publication Data
US 2020/0371847 A1    Nov. 26, 2020

(30) Foreign Application Priority Data

Jan. 29, 2018 (FR) ...................................... 1850658

(51) Int. Cl.
*G06F 9/50* (2006.01)
*G06F 9/26* (2006.01)
(Continued)

(52) U.S. Cl.
CPC ............ *G06F 9/5088* (2013.01); *G06F 9/264* (2013.01); *G06F 9/45558* (2013.01);
(Continued)

(58) Field of Classification Search
CPC ............................... G06F 9/4881; G06F 9/507
See application file for complete search history.

(56) References Cited

U.S. PATENT DOCUMENTS 7,802,073 B1    9/2010 Cheng et al.
9,063,796 B2 *  6/2015 Giusto .................. G06F 9/4881
(Continued)

FOREIGN PATENT DOCUMENTS

CN    103685000 A    3/2014
CN    104718532 A    6/2015

OTHER PUBLICATIONS

Wenhao Wang; Optimizing Application Distribution on Multi-Core Systems within AUTOSAR; Mar. 16, 2016; (Year: 2016).*
(Continued)

*Primary Examiner* — Dong U Kim
(74) *Attorney, Agent, or Firm* — Nixon & Vanderhye

(57) ABSTRACT

Disclosed is a method for designing an application task architecture for an electronic control unit based on an AUTOSAR operating system that is adaptable to a plurality of microcontrollers. Prior to association with a microcontroller, the method involves developing the application task architecture by using at least one virtual core different from the one or more cores of the microcontroller, the various tasks being assigned respectively to the at least one virtual core, and associating the at least one virtual core with the one or more cores of the microcontroller so as to allocate tasks assigned to the at least one virtual core to the core or among the cores of the microcontroller.

15 Claims, 1 Drawing Sheet

(51) Int. Cl.
*G06F 9/455* (2018.01)
*G06F 9/48* (2006.01)

(52) U.S. Cl.
CPC .......... *G06F 9/4881* (2013.01); *G06F 9/5077* (2013.01); *G06F 2009/4557* (2013.01); *G06F 2009/45575* (2013.01)

(56) References Cited

U.S. PATENT DOCUMENTS

| 2015/0007196 | A1* | 1/2015 | Toll | G06F 9/5088 |
| | | | | 718/105 |
| 2015/0277984 | A1 | 10/2015 | Abraham et al. | |
| 2017/0286161 | A1* | 10/2017 | Lim | H04J 3/06 |
| 2018/0107507 | A1* | 4/2018 | Lin | G06F 9/5066 |

OTHER PUBLICATIONS

Daniel Lohmann; AUTOBEST: a united AUTOSAR-OS and ARINC 653 kernel; May 2015; (Year: 2015).*

Nagarjuna Rao Kandimala; Safety and Security Features in AUTOSAR; Nov. 15, 2012; (Year: 2012).*

International Search Report for PCT/FR2019/050129 dated Apr. 5, 2019, 6 pages, with English Translation.

Niimi et al., "Virtualization Technology and Using Virtual CPU in the Context of ISO26262: The E-Gas Case Study", SAE Technical Paper Series, Apr. 8, 2013, vol. 1, 12 pages.

Office Action issued in Chinese Patent Application No. 201980010429.X dated Dec. 22, 2022.

* cited by examiner

METHOD FOR DESIGNING AN APPLICATION TASK ARCHITECTURE OF AN ELECTRONIC CONTROL UNIT WITH ONE OR MORE VIRTUAL CORES

This application is the U.S. national phase of International Application No. PCT/FR2019/050129 filed Jan. 22, 2019 which designated the U.S. and claims priority to French Application No 1850658 filed Jan. 29, 2018, the entire contents of each of which are hereby incorporated by reference.

BACKGROUND OF THE INVENTION

Field of the Invention

The present invention relates to a method for designing an application task architecture for an electronic control unit based on an AUTOSAR operating system that is adaptable to a plurality of microcontrollers including one or more cores as processing units working in parallel for the processing of various tasks by the electronic control unit, the basic software layer being used to connect with a selected microcontroller forming part of the electronic control unit, various tasks of the operating system to be executed by the electronic control unit being allocated by the application task architecture to the one or more cores of the selected microcontroller.

The present invention also relates to a method for integrating a multicore microcontroller into an electronic control unit based on an AUTOSAR operating system comprising an application task architecture designed in accordance with such a design method. The present invention also relates to an electronic control unit based on an AUTOSAR operating system.

The present invention is particularly applicable, but not limited, to the field of motor vehicles for computers for engine command and control, or another with open-system architecture, i.e. a system in which it is possible to reuse functionalities via a standard interface or in a version that is referred to as being adaptable to a system in which it is possible to add or remove new functionalities.

DESCRIPTION OF THE RELATED ART

A basic software layer forms the software connection between a selected microcontroller and the rest of the electronic control unit based on an AUTOSAR operating system, allocating tasks to each core.

The AUTOSAR (AUTomotive Open-System ARchitecture) operating system is an open-system architecture for the automotive sector.

Until recently, engine control computers have used microcontrollers with a single processing unit, i.e. single-core microcontrollers. Lately, microcontrollers including at least two, and advantageously three or more, processing units have appeared, referred to as multiple-core, or multicore microcontrollers, which allow greater computing power than single-core microcontrollers while using an operating frequency equal to that of a single-core microcontroller. The present invention relates both to a single-core microcontroller and to a multicore microcontroller, although this second application is the most advantageous.

Conventionally, the architecture of the software associated with the microcontroller divides functions into sub-functions according to the need to distribute work or to manage the wide range of options. Currently, functions are allocated to two processing units of a multicore microcontroller by for example allocating the application software above an interface of the open-system architecture to one core and allocating the basic software of the system to another core of the microcontroller, more suitable for managing the communication inputs and outputs.

FIG. 1 shows a typical electronic control unit 1 based on an AUTOSAR operating system comprising an application software layer 2, a basic software layer 4 and a microcontroller 5. The application software layer 2 includes the application task architecture that allocates processing tasks to the microcontroller 5.

A task within the meaning of the operating system is a set of functions/processes to be executed in a certain order and with a certain repetition. These processing tasks are not necessarily related functionally, for example the management of speed control, followed by the management of a turbocharger valve, followed by the management of the fuel level in the tank, but they all have in common that they have to be executed at the same frequency. They are therefore integrated into the same task or into two tasks chained over a plurality of cores. Between the application software layer 2 and the basic software layer 4, there is an RTE (RunTime Environment) layer 3 typical of the AUTOSAR standard, which disregards the topology of the network for the purposes of intra- and inter-electronic control unit 1 information exchange between the application software components and between the application software layer 2 and the basic software layer 4.

The software portion of one and the same electronic control unit 1 based on an AUTOSAR operating system with its application software 2 and basic software 4 layers may be associated with various types of microcontrollers 5 having the same number of cores but differing in their design.

For example, for multicore microcontrollers having the same number of cores, it is not necessarily the same cores which perform the same tasks. When adapting the software portion to a new microcontroller, the entire application task architecture has to be redesigned to adapt it to this new microcontroller, which takes time and comes with a high cost.

For example, in a multicore microcontroller, startup is always done via the same core, most commonly predetermined in advance, like for access to the inputs and outputs of the microcontroller. This core is not necessarily the same for the inputs and outputs and for startup, and may differ from one type of microcontroller to another. Suppliers may offer microcontrollers having cores featuring various potential functionalities which allow the user to choose to which core a specific functionality will be dedicated, this specific functionality not being activated or available on the other cores.

A core is also selected to be the operation checker core, and similarly cores are duplicated to provide security control and redundancy.

Numerous types of multicore microcontrollers may be used, ranging from a dual-core microcontroller to a hexa-core microcontroller. Between different microcontrollers with the same number of cores, it is not necessarily the same cores which are used as the startup core, the communication core for information inputs and outputs, and the checker core. For a given family of microcontrollers offered by the same supplier, the functionalities mentioned above are not always available on the same cores from one microcontroller to another in the same family. This is even more relevant for microcontrollers from different suppliers.

Because of this, tasks allocated by the software of the basic layer will not be allocated to the same cores from one microcontroller to another and the application task architecture will not be the same for these microcontrollers.

Consequently, projects based on a given microcontroller will have a different architecture from projects based on another microcontroller since the tasks of the operating system have to be allocated to a given core.

In the automotive sector, and in particular for an electronic control unit based on an AUTOSAR operating system, cost considerations are so critical that a strategy for reusing the application task architecture is required. This could be achieved by means of reusable functions which would be integrated into different projects while being based on the same platform.

According to the approach of the prior art, reuse and synergy between projects for different microcontrollers are made difficult, given that it is not possible to share a common task architecture among microcontrollers having in particular the same number of cores.

The problem on which the present invention is based is for an electronic control unit based on an AUTOSAR operating system to design the application task architecture for this electronic control unit which is able to facilitate the adaptation of different types of single-core or multicore microcontrollers to the electronic control unit.

SUMMARY OF THE INVENTION

To this end, the present invention relates to a method for designing an application task architecture for an electronic control unit based on an AUTOSAR operating system that is adaptable to a plurality of microcontrollers, including one or more cores as processing members working in parallel for the execution of various tasks of an operating system by the electronic control unit, the basic software architecture being used to connect with a selected microcontroller forming part of the electronic control unit, various tasks of the operating system to be performed by the electronic control unit being allocated by the application task architecture to the one or more cores of the selected microcontroller, characterized in that, prior to association with a selected microcontroller, the method involves developing the application task architecture by using at least one virtual core different from the one or more cores of the microcontroller, the various tasks being assigned respectively to said at least one virtual core, and associating said at least one virtual core with the one or more cores of the selected microcontroller so as to allocate tasks assigned to said at least one virtual core to the core or among the cores of the selected microcontroller.

The electronic control unit based on an AUTOSAR operating system may be an engine control unit, a unit for controlling the transmission of a motor vehicle or any other unit responsible for the operation of onboard members in the motor vehicle.

To avoid the wide range of microcontrollers affecting project architectures, the present invention proposes introducing core abstraction.

This abstraction makes it possible to group cores together for separate computing domains, for example with a view to integrating different tasks or to separate computing groupings dependent on the implementation of the software.

The present invention makes it possible to produce an application task architecture which may be common to several types of microcontrollers having the same number of cores. Additionally, such an application task architecture with one or more virtual cores allows easier permutation with less redesign of the software when switching to a different number of cores for a new microcontroller or to another microcontroller for which tasks are allocated to other cores.

Previously, the application task architecture had to assign the essential activities, namely task execution control and redundancy, to a specific core of the microcontroller. However, this specific core might not have been the same for two microcontrollers from the same supplier or especially from a different supplier. This resulted in the design of the application task architecture having to be completely redone.

According to the invention, these essential activities are first entrusted to a virtual core. It is then possible to associate this virtual core with the real core in a microcontroller which is capable of performing these functions. The design of the application task architecture does not need to be rebuilt; just the association of the virtual core with the specific core for these functions in a new microcontroller needs to be re-updated. This is equally valid for the cores responsible for starting up the software or for managing the input and output ports of the microcontroller which may differ from one microcontroller model to another.

It follows that the wide range of microcontrollers no longer affects the application task architecture which no longer needs to be completely re-updated.

The use of one or more virtual cores also helps the programmer of the application task architecture to be independent of the one or more cores of the microcontroller which are related to the design of the microcontroller and which may have different functions for different types of microcontrollers. The present invention makes it possible to share a standardized task architecture despite the differences between microcontrollers. A task is associated with one, and only one, virtual core. This association is rigid. Changing the association requires renaming the task. It is commonplace for such re-association not to be possible. It is necessary to delete and then recreate a new task. A virtual core might have no associated task and therefore remain unused by the operating system. A virtual core is associated with one, and only one, real core. This association is flexible: it can easily be changed according to requirements. A microcontroller core may have no associated virtual core. For example, it is possible to use a hexa-core microcontroller in which only three or four cores are active or used.

Advantageously, the selected microcontroller is a multi-core microcontroller, the application task architecture comprising a plurality of virtual cores. This is the preferred application of the present invention, given that there were multiple possibilities for microcontrollers with different allocations of the essential activities to various cores. To adapt a different microcontroller in place of another microcontroller, all that is required is to change the association of the virtual core with the core of the microcontroller which has the means required to process the functions of the virtual core. This also helps when switching from a microcontroller with a greater number of cores, a new virtual core being added. In this way, a standardization of the application task architecture is obtained.

Advantageously, the tasks assigned to a virtual core are allocated to one and the same core of the selected microcontroller. A virtual core has a specific corresponding core of the microcontroller. It is possible to parallelize the execution of different tasks or to "chain" different tasks so that they are executed one after the other.

Advantageously, when the selected microcontroller comprises at least two separate groups of cores connected by a bridge, a group of virtual cores is produced for each group of cores of the microcontroller, the groups of virtual cores being independent of one another. The groups of cores work separately. It is therefore possible to have a group of virtual cores for each group.

Advantageously, when the selected microcontroller comprises at least one core having secure and non-secure portions, a virtual core is designated to be associated with this secure core of the selected microcontroller. Since the cores of a multicore microcontroller may all have different properties and characteristics, the virtual cores exhibit properties and characteristics that are analogous to their associated microcontroller core. The cores of a microcontroller may all have different security levels ranging for example from high security to low security, with medium security in between. The cores may exhibit different clock speeds for executing the instructions.

The invention also relates to a method for integrating a multicore microcontroller into an electronic control unit based on an AUTOSAR operating system comprising an application task architecture designed in accordance with such a design method, characterized in that, for each core of the microcontroller, its characteristics are determined in relation to its capability to carry out a control through parallel and simultaneous redundant execution of the software, its security level, its capability to start up the microcontroller, its capability to access input and output peripherals of the microcontroller, and each core of the microcontroller is associated with the virtual core to which it is closest in terms of characteristics. The manufacturer of a microcontroller supplies all of the data relating in particular to the cores of the microcontroller. It is then possible for the designer of the software of the application task architecture to know which core of microcontroller corresponds best to a given virtual core, for example the virtual core which performs the function of checker core, and to assign it to the specific core dedicated to this function in the microcontroller, this core potentially differing according to the microcontroller. The same applies for a core of the microcontroller specifically dedicated to starting up the microcontroller which has to be associated with the virtual core dedicated to startup and possibly for the core dedicated to the input and output communications of the microcontroller.

The microcontroller supplier may provide a plurality of cores endowed with security, startup or communication functions, and the user of the microcontroller may choose one of the cores to provide a specific function from among the cores capable of providing this specific function.

Advantageously, an order of priority among these characteristics is established, the capability of carrying out a control being highest priority.

Advantageously, a core affinity is established both for a virtual core and for a core of the microcontroller, the affinity relating to the integration onto a core of the microcontroller, the integration onto a virtual core, the integration onto one and the same core as a given task, the integration onto a core on which the checker core is active or which is the preferred core for access to the peripherals, or a core with a given level of security.

Lastly, the invention relates to an electronic control unit based on an AUTOSAR operating system comprising an application software layer, an application task architecture and a microcontroller, the basic software layer being used to connect with the microcontroller forming part of the electronic control unit, various tasks to be performed by the electronic control unit being allocated by the application task architecture to one or more cores of the microcontroller, characterized in that the application task architecture of the electronic control unit is designed in accordance with such a design method or in that the microcontroller has been integrated into the electronic control unit in accordance with such an integration method.

Advantageously, the microcontroller comprises three cores. Currently, triple-core microcontrollers are the most commonplace as multicore microcontrollers, but are not the only ones.

Lastly, the invention relates to a motor vehicle characterized in that it comprises at least one such electronic control unit based on an AUTOSAR operating system.

BRIEF DESCRIPTION OF THE DRAWINGS

Other features, aims and advantages of the present invention will become apparent on reading the detailed description that follows and on examining the appended drawings given by way of non-limiting examples, and in which.

DESCRIPTION OF THE PREFERRED EMBODIMENTS

In what follows, the microcontroller illustrated in the figures and described below comprises three cores. This is not limiting and the present invention may relate to a single-core microcontroller or a multicore microcontroller with a number of cores other than three.

The mention of a core without qualification refers to a real core of the microcontroller.

Figure 1:
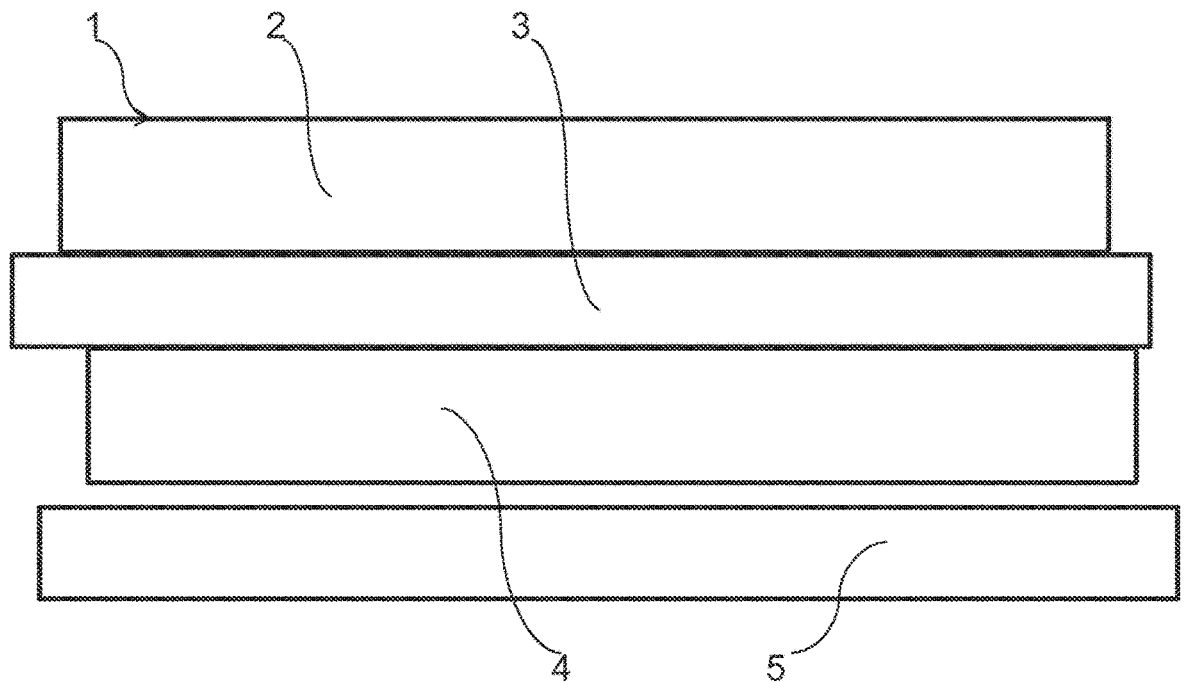
FIG. 1 is a schematic representation of a cross-sectional view of an electronic control unit based on an AUTOSAR operating system that may be used in the context of the present invention.
Figure 2:
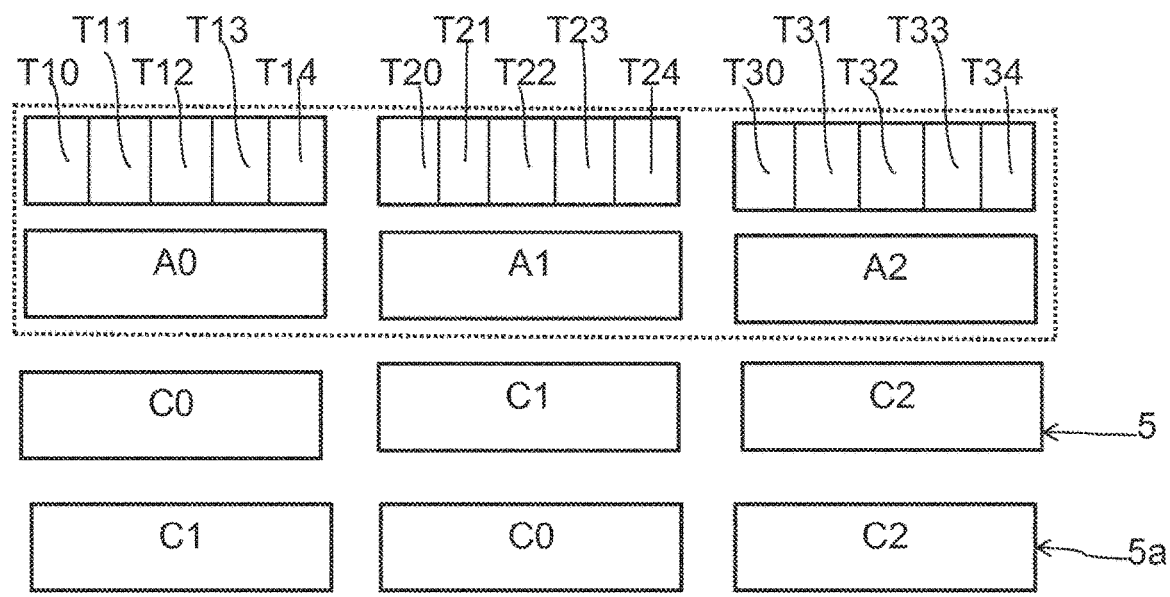
FIG. 2 is a schematic representation of a cross-sectional view of an application task architecture forming part of an electronic control unit based on an AUTOSAR operating system according to the invention, two microcontrollers being shown with this application task architecture including virtual cores.

With reference to FIGS. 1 and 2, the present invention relates to a method for designing an application task architecture for an electronic control unit 1 based on an AUTOSAR operating system that is adaptable to a plurality of microcontrollers 5, 5a, a microcontroller 5, 5a being selected to be associated with the software portion of the electronic control unit 1 based on an AUTOSAR operating system formed by the application software layer 2 integrating the application task architecture, the basic software layer 4 and the runtime environment layer 3.

The basic software layer 4 may include system services, namely the electronic control unit 1, memories, communication services. The basic software layer 4 includes a module for abstraction of the onboard system, a module for abstraction of communication with the microcontroller 5, 5a and a module for abstraction of the microcontroller 5, 5a in terms of input and output communication.

These abstraction modules are different from the virtual cores A0, A1, A2 proposed by the invention which will be described later, being in the application task architecture integrated into the application software layer 2. The basic software layer 4 also includes microcontroller 5, 5a drivers, memory drivers, communication drivers and input and output communication drivers.

The microcontroller 5, 5a includes one or more cores C0, C1, C2 as processing members working in parallel for the processing of various tasks T10-T14, T20-T24, T30-T34 by the electronic control unit 1. The references T10-T14, T20-T24, T30-T34 group together each of the different tasks. Five tasks are shown per core in FIG. 2, but this number is not limiting and may be higher or lower.

The tasks form, per core, sets of tasks with well defined properties. Relationships between the tasks may be established for certain tasks, such as parallel, or conversely chained, executions.

As mentioned above, the application task architecture is used to connect with the selected microcontroller 5, 5a forming part of the electronic control unit 1, various tasks T10-T14, T20-T24, T30-T34 to be executed by the electronic control unit 1 being allocated by the application task architecture to the one or more cores C0, C1, C2 of the selected microcontroller 5, 5a.

According to the invention, prior to association with a selected microcontroller 5, 5a, when designing the software architecture for the electronic control unit 1 based on an AUTOSAR operating system, the method involves developing the application task architecture by using at least one virtual core A0, A1, A2 different from the one or more cores C0, C1, C2 of the microcontroller 5, 5a. This allows abstraction of the one or more cores C0, C1, C2 of the microcontroller 5, 5a.

With reference to FIG. 2, the various tasks T10-T14, T20-T24, T30-T34 to be distributed to the one or more cores C0, C1, C2 of the microcontroller 5, 5a are assigned respectively to the one or more virtual cores A0, A1, A2. It follows that the application task architecture is initially developed completely independently of the cores C0, C1, C2 of the microcontroller. This makes it possible to build an application task architecture which will remain common to all of the different microcontrollers 5, 5a and which will not need to be re-updated when the application task architecture has to be adapted to another microcontroller 5, 5a with the same number of cores C0, C1, C2 as the microcontroller 5, 5a for which the application task architecture was developed.

A generic architecture is thus created which gives an insight into the validity of the portion relative to the application software layer 2 and to the application task architecture.

Next, the one or more virtual cores A0, A1, A2 are associated with the one or more cores C0, C1, C2 of the selected microcontroller 5, 5a so as to allocate tasks T10-T14, T20-T24, T30-T34 previously assigned to said at least one virtual core A0, A1, A2 to the core or among the cores C0, C1, C2 of the selected microcontroller 5, 5a. A virtual core A0, A1, A2 corresponds to a core of the microcontroller C0, C1, C2.

The present invention makes it possible to share the same application task architecture between electronic control units 1 with different microcontrollers 5, 5a having cores C0, C1, C2 exhibiting different properties, for example not having the same security level.

The virtual cores A0, A1, A2 may be used when integrating different applications into a system with one core or with a plurality of multiple cores C0, C1, C2, which may be achieved according to the invention independently of the microcontroller 5, 5a used.

In FIG. 2, which illustrates the non-limiting case of two microcontrollers 5, 5a with three cores C0, C1, C2, tasks T10-T14, T20-T24, T30-T34 have been distributed across three virtual cores A0, A1, A2. Two microcontrollers 5, 5a are shown with different distributions of real cores C0, C1, C2 for accomplishing these tasks T10-T14, T20-T24, T30-T34. The virtual cores A0, A1, A2 will therefore not be associated with the same arrangement of real cores C0, C1, C2 in the two cases but with the real core which best matches a specific virtual core A0, A1, A2 and which may occupy a different position in the arrangement of the three cores C0, C1, C2 in the given microcontroller 5, 5a.

The virtual core A0 may correspond to a high-security core that is able to perform the function of checker core. The remaining two other virtual cores bear the references A1 and A2.

Solely by way of non-limiting illustration, for a first microcontroller with the reference 5, the checker core is the core with the reference C0, which is also used to start up the microcontroller 5, while for a second microcontroller with the reference 5a, the checker core is the core with the reference C1, different from the startup core which is the core C0. Therefore, for this second microcontroller 5a, it is the core C1 which is associated with the virtual core A0. Adapting the application task architecture implemented for the first microcontroller 5 to the second microcontroller 5a only requires making provision for a modification in the step of associating the virtual cores A0, A1, A2 with a respective core C0, C1, C2 of the microcontroller 5, 5a, the rest of the architecture being retained, which is a substantial advantage afforded by the present invention.

There may be microcontrollers with the possibility of selecting a checker core from among a plurality of cores capable of performing this role, the user having this possibility to make a selection. The checker core selected in this way is associated with the virtual core dedicated to checking.

As a non-limiting example of a set of virtual cores A0, A1, A2 adapted to a specific microcontroller 5, 5a, reference may be made to a virtual core A0 made input- and output-secure with secure partitions or otherwise, a non-secure virtual communication core and a non-secure alternative core, which correspond, respectively, to real cores of a triple-core microcontroller 5, 5a, which is a non-limiting example of a multicore microcontroller 5, 5a in the context of the present invention.

Thus, when the selected microcontroller 5, 5a has multiple cores C0, C1, C2, the application task architecture may comprise a plurality of virtual cores A0, A1, A2, with the same number of virtual cores A0, A1, A2 as cores C0, C1, C2 of the microcontroller 5, 5a. The tasks T10-T14, T20-T24, T30-T34 assigned to a virtual core A0, A1, A2 may be assigned to the same core C0, C1, C2 of the selected microcontroller 5, 5a.

Increasing numbers of microcontrollers 5, 5a have groups of cores C0, C1, C2 working in parallel. When the microcontroller 5, 5a selected to form part of the electronic control unit 1 based on an AUTOSAR operating system comprises at least two separate groups of cores C0, C1, C2 connected by a bridge, a group of virtual cores A0, A1, A2 is produced for each group of cores C0, C1, C2 of the microcontroller 5, 5a, the groups of virtual cores A0, A1, A2 being independent of one another. For example, for n or more groups of three cores C0, C1, C2 in a microcontroller 5, 5a, groups A0, A1, A2, then B0, B1, B2 and so on until the nth letter may be produced, which is not shown in FIG. 2.

A virtual core A0, A1, A2 may therefore be defined by two characters. The first character, for example A, indicates, in a non-limiting manner, the domain of application, while the second character is the number associated with the virtual core A0, A1, A2 in its domain of application, for example from 1 to 3, which is non-limiting.

The tasks T10-T14, T20-T24, T30-T34 may be classified as acquisition tasks with communication between the application task architecture and the application software layer 2 such as acquisitions and associated diagnostics or commands passing from the application layer to the basic layer 4, for example information on new data from the application layer 2 transmitted to the basic layer 4. In practice, one and the same task may contain both command control and acquisition.

Tasks T10-T14, T20-T24, T30-T34 may be distributed across a plurality of virtual cores A0, A1, A2. The tasks T10-T14, T20-T24, T30-T34 may be classed according to their periodic or random character or according to their durations of execution and distributed across the virtual cores A0, A1, A2 according to these criteria.

When the selected microcontroller 5, 5a comprises at least one core C0 or C1 having secure and non-secure portions, a first virtual core A0 may be designated to be associated with this secure core C0 or C1 of the selected microcontroller 5, 5a, this first virtual core being the core A0 previously illustrated in FIG. 2 virtually having secure and non-secure portions. Such a virtual core A0 may therefore be associated with a checker core in the microcontroller.

The invention also relates to a method for integrating a multicore microcontroller 5, 5a into an electronic control unit 1 based on an AUTOSAR operating system comprising an application task architecture designed in accordance with such a design method.

For each core C0, C1, C2 of the microcontroller 5, 5a, its characteristics in relation to its capability to carry out a control through parallel execution of the simultaneous identical tasks T10-T14, T20-T24, T30-T34, its security level, its capability to start up the microcontroller 5, 5a and its capability for input and output communication with the application task architecture are determined.

This corresponds to the specifications given by the supplier of the microcontroller 5, 5a. The supplier may propose several combinations of specific cores for one and the same microcontroller, the user of the microcontroller being able to choose one core from a plurality of cores capable of becoming a checker core, a startup core or an input and output communication core.

With each core C0, C1, C2 of the microcontroller 5, 5a, a virtual core A0, A1, A2 to which it is closest in terms of characteristics is associated, each virtual core A0, A1, A2 having been virtually designed to virtually include such characteristics as are required for the operation of the microcontroller.

From among all of these characteristics, an order of priority among the characteristics may be established, the capability of carrying out a control being highest priority. For example, in FIG. 2, the core C0 of the first microcontroller 5 is secure and capable of performing the function of checker core, but it is also capable of starting up the microcontroller 5, while the core C1 of the second microcontroller 5a is secure and capable of performing the function of checker core, but it is not capable of performing startup. Association with a virtual core A0, A1, A2 will be carried out for both cores C0, C1, C2 of the two microcontrollers 5, 5a with a secure virtual core A0 having priority.

For any functionality to be integrated, there is the possibility to specify, in the design phase, a core affinity, the core being able to be virtual or real.

This core affinity will be verified, in a tool-based manner, when integrating onto the various projects.

For example, the core affinity may be expressed in various ways such as the integration onto a real core of the microcontroller, the integration onto a virtual core, the integration onto one and the same core as a given function, the integration onto a core on which the checker core is active or which is the preferred core for access to the peripherals or a core with a given level of security, etc.

This last formulation is the most advantageous since it is based on an abstraction principle, being positioned in relation to a characteristic of the core instead of in relation to a given core. The invention lastly relates to an electronic control unit 1 based on an AUTOSAR operating system comprising an application software layer 2 integrating an application task architecture and a microcontroller 5 or 5a, the application task architecture being used for the integration of the microcontroller 5 or 5a into the the electronic control unit 1, various tasks T10-T14, T20-T24, T30-T34 to be performed by the electronic control unit 1 being allocated by the application task architecture to one or more cores C0, C1, C2 of the microcontroller 5 or 5a.

The application task architecture for the electronic control unit 1 is designed in accordance with a design method such as described above in which the microcontroller 5, 5a has been integrated into the electronic control unit 1 based on an AUTOSAR operating system in accordance with an integration method such as described above.

The invention claimed is:

1. A method for designing an application task architecture for an electronic control unit based on an operating system adaptable to operate on a plurality of microcontrollers that each comprise plural cores as processing members configured to work in parallel for executing tasks of the operating system, a basic software layer of the application task architecture configured to connect with a selected microcontroller of the plurality of microcontrollers that forms part of the electronic control unit, the tasks of the operating system to be executed by the electronic control unit being allocated by the application task architecture to at least one of the cores of the selected microcontroller, the method comprising:
   developing the application task architecture to use one or more virtual cores, different from the cores of the selected microcontroller, each one of the tasks of the operating system being assigned to said one or more virtual cores; and
   associating each one of said one or more virtual cores with one core of the cores of the selected microcontroller, so that for each one of said one or more virtual cores, the tasks of the operating system assigned thereto are allocated to the one core associated with the one of said one or more virtual cores,
   wherein at least one core among the cores of the selected microcontroller is determined to have a characteristic, of a set of characteristics defining core capabilities, different from that of an other one of the cores of the selected microcontroller,
   wherein each of the characteristics is defined by an order of priority relative to other ones of said characteristics, and
   wherein said associating of the one or more virtual cores is based on the characteristics of the cores and the priorities associated with the characteristics.

2. The design method as claimed in claim 1, wherein the application task architecture uses at least two virtual cores, and each one of said at least two virtual cores is associated with one of the cores of the selected microcontroller.

3. The design method as claimed in claim 2,
   wherein the cores of the selected microcontroller are arranged in at least two separate groups of cores connected by a bridge, and wherein a group of virtual cores is produced for each group of the at least two separate groups of cores of the microcontroller, the groups of virtual cores being independent of one another.

4. The design method as claimed in claim 2, wherein the at least one core among the cores of the selected microcontroller is a checker core having secure and non-secure portions.

5. The design method as claimed in claim 1, wherein the at least one core among the cores of the selected microcontroller is a checker core having secure and non-secure portions.

6. The design method as claimed in claim 1, wherein the one or more characteristics comprise i) a capability to carry out a control through redundant execution of software, ii) a security level, iii) a capability to start up the selected microcontroller, and iv) a capability to access input and output peripherals of the selected microcontroller.

7. A method for integrating a multicore microcontroller into an electronic control unit controlled by an operating system adaptable to operate on a plurality of microcontrollers that each comprise plural cores as processing members configured to work in parallel for executing tasks of the operating system, a basic software layer of the application task architecture configured to connect with the multicore microcontroller, the tasks of the operating system to be executed by the electronic control unit being allocated by the application task architecture to at least one of the cores of the multicore microcontroller, the method comprising:
    developing the application task architecture by using plural virtual cores, different from the cores of the multicore microcontroller, each one of the tasks of the operating system being assigned to a virtual core of said virtual cores;
    determining, for each core among the cores of the multicore microcontroller, a characteristic from a set of characteristics including i) a capability to carry out a control through redundant execution of software, ii) a security level, iii) a capability to start up the multicore microcontroller, and iv) a capability to access input and output peripherals of the multicore microcontroller, where each one of said characteristics has a priority associated therewith; and
    associating each core among the cores of the multicore microcontroller with one correspondent virtual core of the virtual cores,
    wherein at least one core among the cores of the multicore microcontroller is determined to have one or more of said characteristics different from an other one among the cores of the multicore microcontroller, and
    wherein said associating of each core among the cores of the multicore microcontroller is based on the one or more different characteristics of the cores of the multicore microcontroller and based on the priorities associated with the different characteristics.

8. The integration method as claimed in claim 7, wherein in said associating of each core among the cores of the multicore microcontroller based on the different characteristics of the cores of the multicore microcontroller, the capability to carry out the control through redundant execution of software is considered at a higher priority than all others of said characteristics.

9. The integration method as claimed in claim 8, further comprising:
    establishing a core affinity for at least one virtual core of the virtual cores and for at least one core of the cores of the multicore microcontroller,
    wherein the core affinity is defined as any one of i) an integration onto a core of the multicore microcontroller, ii) an integration onto a virtual core, iii) an integration onto a same core of the multicore microcontroller as a given task, iv) an integration onto a core of the multicore microcontroller that operates as a checker core, v) an integration onto a core of the multicore microcontroller that operates as a preferred core for access to peripherals, and vi) an integration onto a core of the multicore microcontroller that operates at a given level of security.

10. The integration method as claimed in claim 7, further comprising:
    establishing a core affinity for at least one virtual core of the virtual cores and for at least one core of the cores of the multicore microcontroller,
    wherein the core affinity is defined as any one of i) an integration onto a core of the multicore microcontroller, ii) an integration onto a virtual core, iii) an integration onto a same core of the multicore microcontroller as a given task, iv) an integration onto a core of the multicore microcontroller that operates as a checker core, v) an integration onto a core of the multicore microcontroller that operates as a preferred core for access to peripherals, and vi) an integration onto a core of the multicore microcontroller that operates at a given level of security.

11. An electronic control unit, comprising:
    a microcontroller equipped with plural processor cores,
    the microcontroller controlled by an operating system that includes an application software layer, a basic software layer, and an application task architecture integrated into the application software layer, the basic software layer being used to connect with the microcontroller,
    the application task architecture of the operating system configured to allocate tasks of the operating system to the processor cores of the microcontroller,
    wherein the application task architecture of the electronic control unit is configured to implement one or more virtual cores, different from the processor cores of the microcontroller, each one of the tasks of the operating system being assigned to said one or more virtual cores,
    wherein the application task architecture associates each one of said one or more virtual cores with one core of the processor cores of the microcontroller, so that for each one of said one or more virtual cores, the tasks of the operating system assigned thereto are allocated to the one core associated with the one of said one or more virtual cores,
    wherein at least one processor core among the processor cores of the microcontroller has a characteristic, of a set of characteristics defining core capabilities, different from that of an other one of the processor cores of the microcontroller,
    wherein each of the characteristics is defined by an order of priority relative to other ones of said characteristics, and
    wherein the one or more virtual cores is associated with the at least one processor core among the processor cores based on the characteristics of the at least one processor core among the processor cores and the priorities associated with the characteristics.

12. The electronic control unit as claimed in claim 11, wherein the microcontroller comprises three processor cores.

13. A motor vehicle comprising at least one electronic control unit as claimed in claim 11.

14. The electronic control unit as claimed in claim 11, wherein the one or more characteristics comprise i) a capability to carry out a control through redundant execution of software, ii) a security level, iii) a capability to start up the microcontroller, and iv) a capability to access input and output peripherals of the microcontroller.

15. The electronic control unit as claimed in claim 11, wherein the at least one processor core among the processor cores of the microcontroller is a checker core having secure and non-secure portions.

* * * * *